United States Patent
Boss et al.

(10) Patent No.: US 9,325,930 B2
(45) Date of Patent: Apr. 26, 2016

(54) COLLECTIVELY AGGREGATING DIGITAL RECORDINGS

(71) Applicant: International Business Machines Corporation, Armonk, NY (US)

(72) Inventors: Gregory J. Boss, Saginaw, MI (US); James R. Kozloski, Yorktown Heights, NY (US); Clifford A. Pickover, Yorktown Heights, NY (US); Anne R. Sand, Canon City, CO (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 649 days.

(21) Appl. No.: 13/677,829

(22) Filed: Nov. 15, 2012

(65) Prior Publication Data

US 2014/0133825 A1    May 15, 2014

(51) Int. Cl.
*H04N 5/77* (2006.01)
*H04N 5/76* (2006.01)
*H04N 5/91* (2006.01)
*G11B 27/034* (2006.01)
*H04N 21/00* (2011.01)

(52) U.S. Cl.
CPC ............. *H04N 5/76* (2013.01); *G11B 27/034* (2013.01); *H04N 5/772* (2013.01); *H04N 5/91* (2013.01); *H04N 21/00* (2013.01)

(58) Field of Classification Search
CPC ........... H04N 5/76; H04N 5/772; H04N 5/91; H04N 21/00; G11B 27/034
See application file for complete search history.

(56) References Cited

U.S. PATENT DOCUMENTS

| 6,426,771 | B1 * | 7/2002 | Kosugi ..................... 348/222.1 |
| 6,608,650 | B1 * | 8/2003 | Torres et al. ............. 348/333.02 |
| 7,739,076 | B1 | 6/2010 | Vock et al. |
| 2005/0193421 | A1 * | 9/2005 | Cragun .......................... 725/80 |
| 2009/0210797 | A1 * | 8/2009 | Cragun et al. ................. 715/730 |
| 2010/0183280 | A1 | 7/2010 | Beauregard et al. |
| 2010/0208082 | A1 * | 8/2010 | Buchner et al. ............ 348/207.1 |
| 2011/0293201 | A1 * | 12/2011 | Uwai et al. .................... 382/305 |

(Continued)

OTHER PUBLICATIONS

Wurmlin et al "3D Video Fragments: Dynamic Point Samples for Real-Time Free-Viewpoint Video", Computers & Graphics, Special Issue on Coding, Compression and Streaming Techniques for 3D and Multimedia Data Stefan Gumhold and Stefan Noll, pp. 1-11.

(Continued)

*Primary Examiner* — Tat Chio
(74) *Attorney, Agent, or Firm* — Cantor Colburn LLP; Vazken Alexanian (57) ABSTRACT

Digital recordings of an event are collectively aggregated to improve the quality of the recordings. A user recording of an event by a user recording device is evaluated to determine a subject and quality of the user recording. Other recording devices in the vicinity of the user recording device that are recording the same subject concurrently are identified to expand the capabilities of the user recording device through crowdsourcing. An aspect of recordings from the other recording devices is analyzed to determine if it is superior in quality to the user recording according to crowdsourced quality assessments. Feedback is sent to the user recording device to expand the capabilities of the user recording device and to improve the quality of the user recording. All recordings of the event are pooled to create a higher quality composite recording using digital improvement techniques and the composite recording is offered for download.

22 Claims, 5 Drawing Sheets

(56) References Cited

U.S. PATENT DOCUMENTS

2012/0039579 A1    2/2012  Esposito
2012/0076357 A1    3/2012  Yamamoto et al.
2013/0108236 A1*   5/2013  Mestha et al. ............... 386/230
2013/0162781 A1*   6/2013  Hubner et al. ................ 348/47

OTHER PUBLICATIONS

Xu et al "Architecture and Algorithms for Tracking Football Players with Multiple Cameras", IEE Proceedings Vision, Image & Signal Processing, 2006, 5 pages.

Nakano et al "Camera Calibration Techniques Using Multiple Cameras of Different Resolutions and Bundle of Distances", International Archives of Photogrammetry, Remote Sensing and Spatial Information Sciences, vol. XXXVIII, Part 5, Commission V Symposium, Newcastle upon Tyne, UK. 2010, pp. 484-489.

Cotton et al "Audio Fingerprinting to Identify Multiple Videos of an Event", Acoustics Speech and Signal Processing (ICASSP), 2010 IEEE International Conference, 4 pages.

D'Apuzzo "Surface Measurement and Tracking of Human Body Parts from Multi-Image Video Sequences", ISPRS Journal of Photogrammetry & Remote Sensing 56 (2002) pp. 360-375.

* cited by examiner

COLLECTIVELY AGGREGATING DIGITAL RECORDINGS

BACKGROUND

The present invention relates to digital recordings, and more specifically, expanding the capabilities of a recording device by collectively aggregating digital recordings of an event using multiple recording devices in a registered network.

Typically, a public event attracts a large number of witnesses, spectators, attendees, and/or visitors to the location of the event. A user attending the event is typically in possession of one or more of a variety of digital recording devices including digital still cameras, digital video cameras, and digital audio recording devices. The user may record the event in an ad hoc manner, often without the skill or expertise necessary to make a high-quality recording. For example, the user may not be located optimally with respect to position and lighting for a high-quality recording or the user may not possess optimal equipment for a high-quality recording.

In addition to varying skills among users recording the event, various environmental conditions at the event may make a high-quality recording difficult even for an expert. These conditions include weather conditions, such as clouds, precipitation, and wind, poor lighting, ambient noise, and the unpredictability and temporary nature of the event to be recorded. Finally, digital recording devices and their associated remote online repositories may have a finite storage memory. Accordingly, during a lengthy event, the storage memory of the digital recording device may become exhausted.

SUMMARY

According to an embodiment, a computer-implemented method is provided to collectively aggregate digital recordings of an event to improve the quality of the recordings. A user recording of an event by a user recording device is evaluated to determine a subject and quality of the user recording. Other recording devices in the vicinity of the user recording device that are recording the same subject concurrently are identified to expand the capabilities of the user recording device through crowdsourcing. An aspect of recordings from the other recording devices is analyzed to determine if it is superior in quality to the user recording according to crowdsourced quality assessments. Feedback is sent to the user recording device to expand the capabilities of the user recording device and to improve the quality of the user recording. All recordings of the event are pooled to create a higher quality composite recording using digital improvement techniques and the composite recording is offered to the user to download.

According to another embodiment, a computer system comprising a processor, a system memory, and a bus that couples various system components including the system memory to the processor, is configured to collectively aggregate digital recordings of an event to improve the quality of the recordings. A user recording of an event by a user recording device is evaluated to determine a subject and quality of the user recording. Other recording devices in the vicinity of the user recording device that are recording the same subject concurrently are identified to expand the capabilities of the user recording device through crowdsourcing. An aspect of recordings from the other recording devices is analyzed to determine if it is superior in quality to the user recording according to crowdsourced quality assessments. Feedback is sent to the user recording device to expand the capabilities of the user recording device and to improve the quality of the user recording. All recordings of the event are pooled to create a higher quality composite recording using digital improvement techniques and the composite recording is offered to the user to download.

According to another embodiment, a computer program product comprising a computer readable storage medium having computer readable program code stored thereon that, when executed, performs a method to collectively aggregate digital recordings of an event to improve the quality of the recordings. A user recording of an event by a user recording device is evaluated to determine a subject and quality of the user recording. Other recording devices in the vicinity of the user recording device that are recording the same subject concurrently are identified to expand the capabilities of the user recording device through crowdsourcing. An aspect of recordings from the other recording devices is analyzed to determine if it is superior in quality to the user recording according to crowdsourced quality assessments. Feedback is sent to the user recording device to expand the capabilities of the user recording device and to improve the quality of the user recording. All recordings of the event are pooled to create a higher quality composite recording using digital improvement techniques and the composite recording is offered to the user to download.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Embodiments disclosed herein provide a method for expanding the capabilities of a recording device and improving the quality of, and access to, recordings of public events by aggregating recordings from a plurality of digital recording devices. An embodiment of the method improves the quality of recordings using digital noise reduction and multi-source averaging. Automated feedback is provided to registered users through a crowd-sourcing service, which allows users to expand the capabilities of their recording devices and to make recordings that optimally contribute to a final improved recording. A final improved collective recording is made available for downloading to registered users according to an embodiment. An embodiment also provides the registered user of the recording device samples of previous pictures or videos in order to improve the user experience.

It is understood in advance that although this invention includes a detailed description on cloud computing, implementation of the teachings recited herein are not limited to a cloud computing environment. Rather, embodiments of the invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
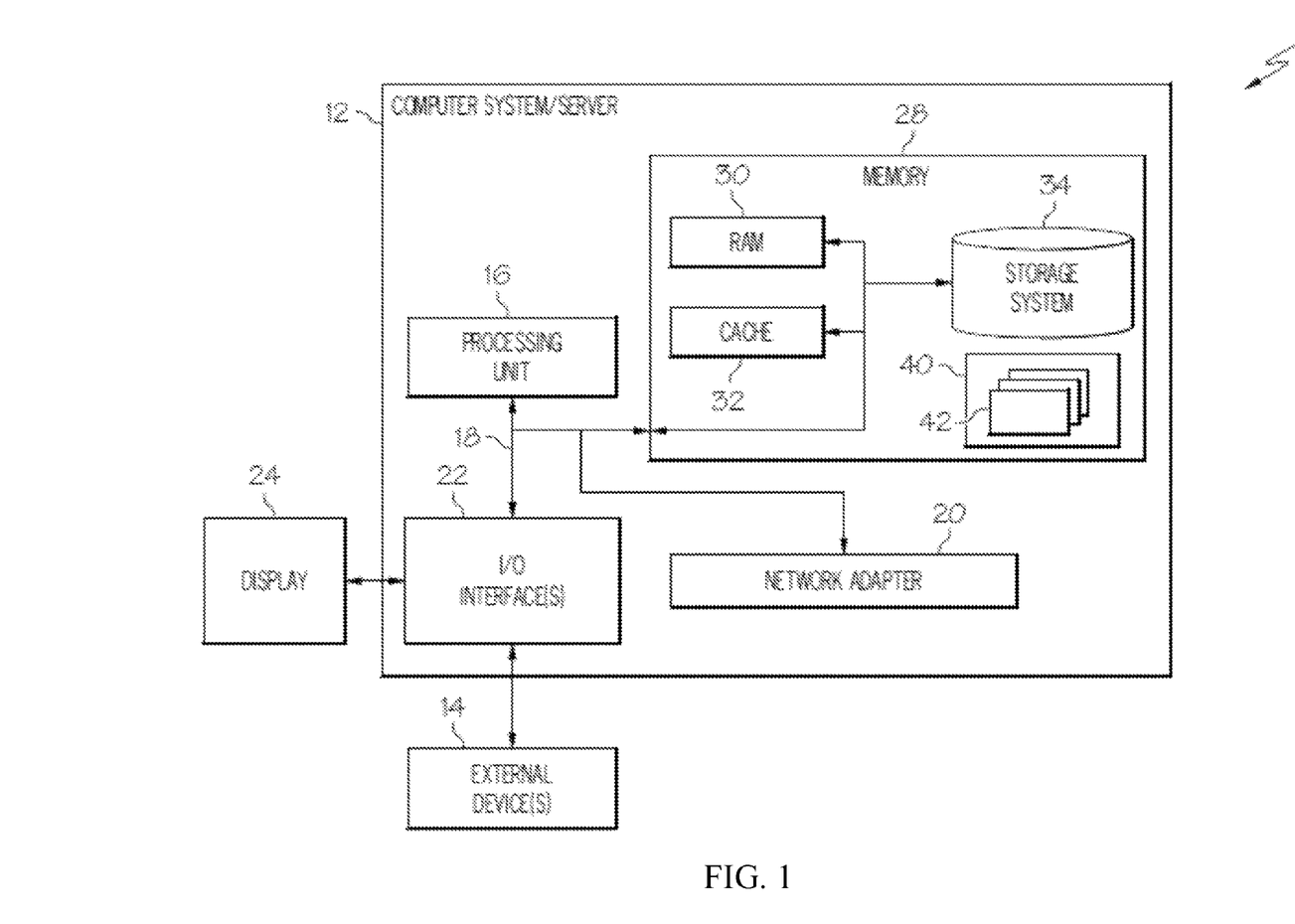
FIG. 1 depicts a cloud computing node according to an embodiment of the present invention.

Referring now to FIG. 1, a block diagram of a cloud computing node for collectively aggregating digital recordings of an event of an embodiment is shown. Cloud computing node 10 is only one example of a suitable cloud computing node and is not intended to suggest any limitation as to the scope of use or functionality of embodiments described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 may include a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
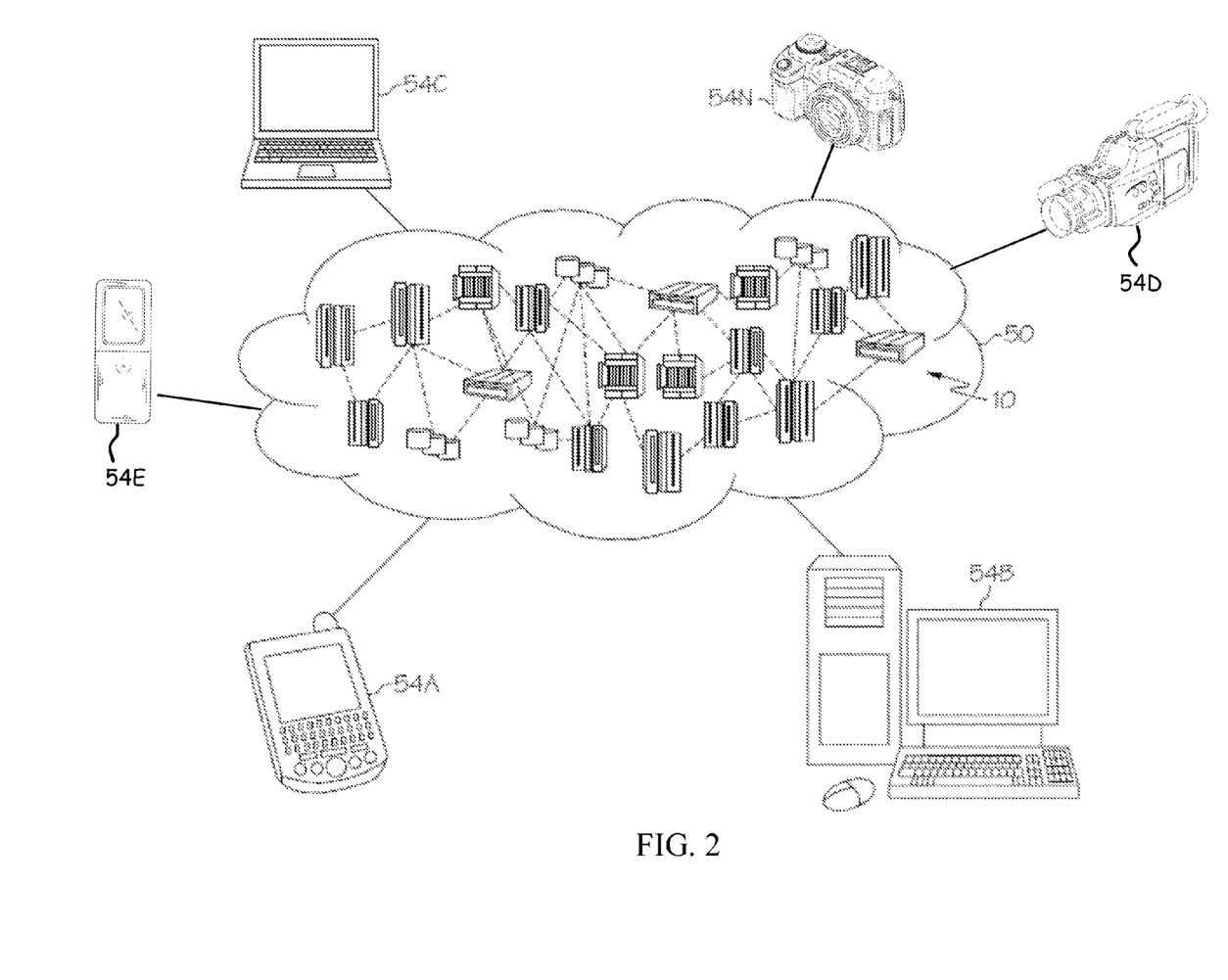
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, digital video camera 54D, digital audio recording device 54E, and/or digital still camera 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
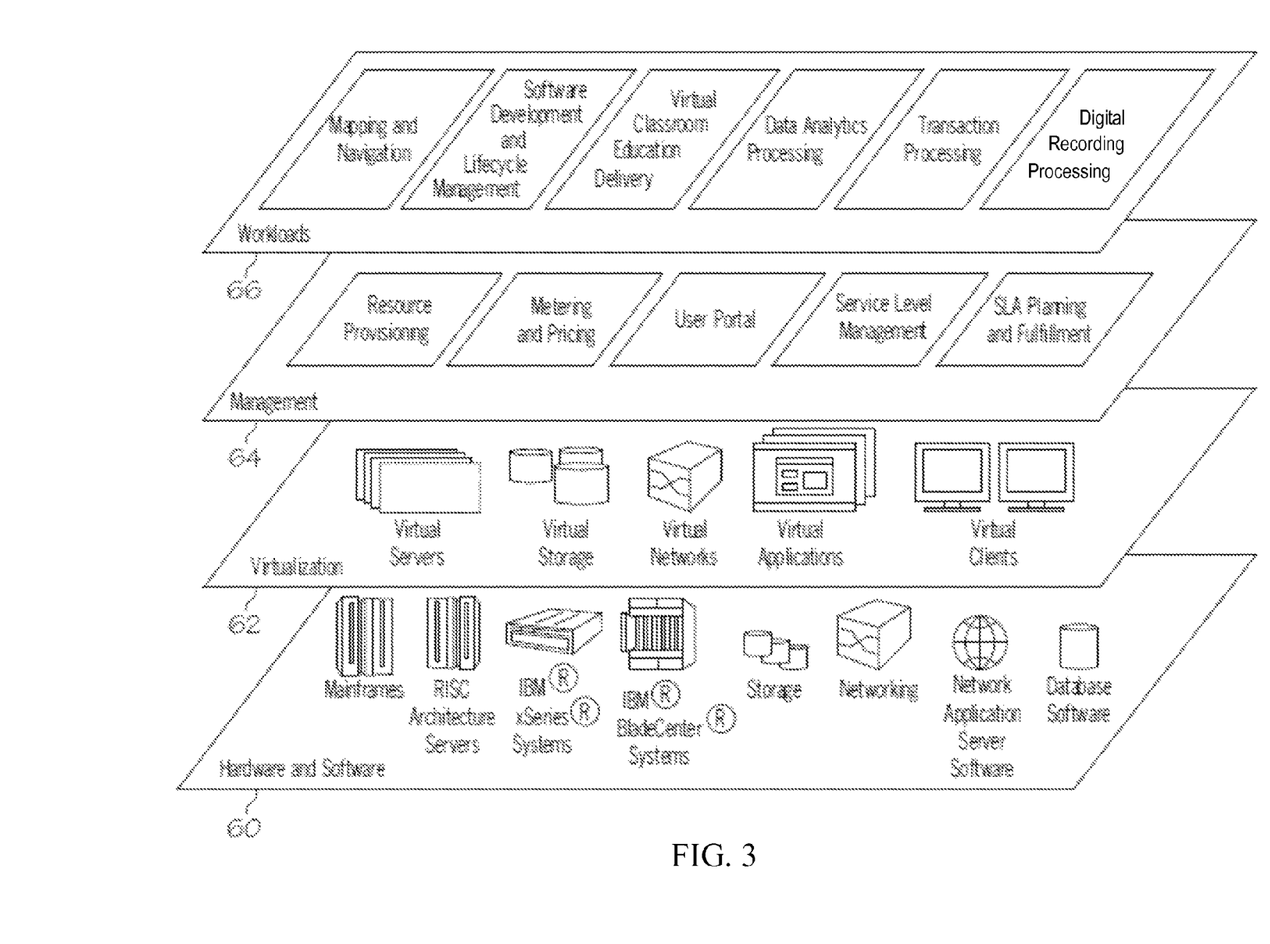
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and digital recording processing.

Figure 4:
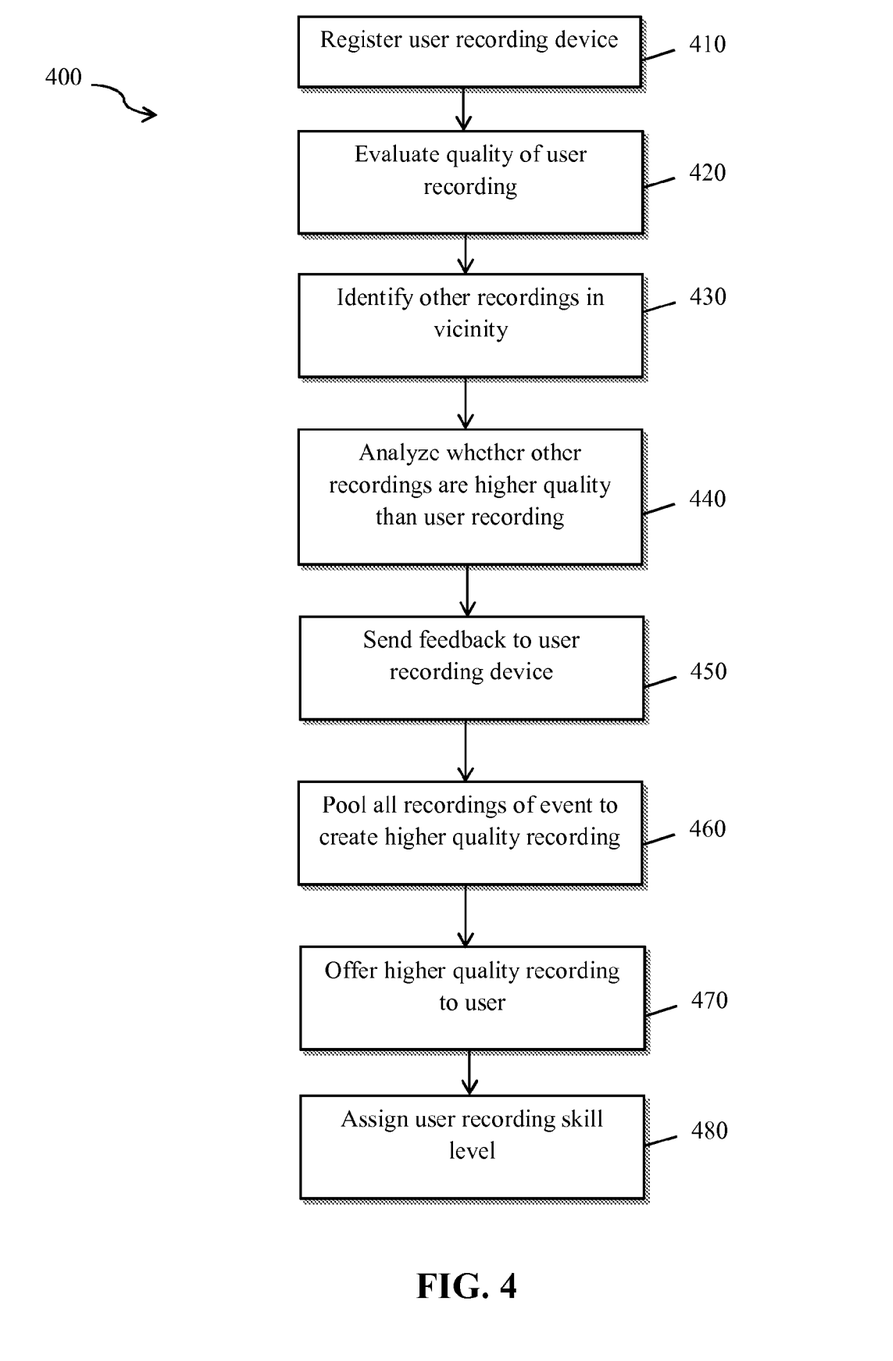
FIG. 4 depicts a flow diagram of an operation for expanding the capabilities of a recording device and improving the quality of a digital recording of a public event by aggregating multiple recording devices according to an embodiment of the present invention.

With reference now to FIG. 4, an embodiment of an operation 400 for improving the quality of a digital recording of a public event by aggregating multiple recording devices is shown. In block 410, a user registers a digital recording device, such as a personal digital assistant (PDA) or cellular telephone 54A, a desktop computer 54B, a laptop computer 54C, a digital video camera 54D, a digital audio recording device 54E, and/or digital still camera 54N, with a computer server 12 for digital recording processing according to an embodiment.

The computer server 12 maintains a database for storing uploaded recordings, data regarding each registered user and their location, a status of a recording for each registered user, a recording capability for each registered user, and characteristics of the recording device used by each registered user. Characteristics of the recording device may include the time of the most recent recording, the anticipated duration of the recording, the location and orientation of the recording device, the subject of the recording, the quality of recording (e.g., mono, stereo, bit depth, bit rate), the capabilities of the recording device, the remaining memory of the recording media, the remaining battery life of the recording device, and the permission level set by a user for access to their recording device.

In an embodiment, the digital recording processing is provided through a preloaded application on the registered digital recording device. The user records a public event using the registered digital recording device. The public event may include, but is not limited to, a crime scene, a concert, a convention, a natural disaster, a local or national emergency, a vehicular accident, a legal proceeding, or a virtual universe.

In block 420, a recording of an event by the user of the registered recording device is evaluated with a processing device of the computer server 12 either in real-time or post-processing. The evaluation of the recording includes a determination of a subject and quality of the recording. The subject and quality of the recording may be determined using digital signal processing of the individual recordings and annotations provided by the user, such as indications that the recording should be deleted. The evaluation of the recording may also include a determination of the time, duration, location, and orientation of the recording using known features typically available onboard digital recording devices 54A-N.

Based on the evaluation of the registered recording, a determination may be made to offer services to the registered recording to improve the capabilities of the registered recording device and the quality of the registered recording. The determination may occur once a preset threshold is reached, at which point a trigger signals a need for better quality in the registered recording. An embodiment for improving the recording of a public event involves automatically joining other registered recording devices in the geographic vicinity of the registered recording device to aid in capturing elements not possible with a single recording device. As shown in block 430, an embodiment identifies the other registered recording devices in the same vicinity that are concurrently recording the same subject as the user's registered recording device.

According to an embodiment, the capabilities of the user's registered recording device may be expanded by offering a crowdsourcing service. The crowdsourcing service assigns each registered recording device in the vicinity with a task for contribution to a collaborative recording. Through the crowdsourcing service, the capabilities of a single registered recording device, such as its recording quality, its battery life, and its available memory, may be expanded. For example, if one recording device has already captured a high quality recording from a certain vantage point, a duplicative recording from the same vantage point will not be necessary. Accordingly, a duplicative recording device of lower quality may be assigned another vantage point or may be momentarily shutdown to conserve memory and/or battery life.

In block 440, an aspect of the recordings from the other recording devices is analyzed to determine if the aspect of the other recordings is superior in quality to the user recording according to crowdsourced quality assessments. An embodiment of crowdsourced quality assessments may include, but is not limited to, measuring a baseline noise of a recording to determine which recording is lower in video or audio noise, determining sources of the recording using an independent component analysis to separate the sources from the noise, determining a lighting source based on differences in brightness and contrast available from the recording devices at different vantage points, and evaluating historical data of the recording made at the same location at different times.

In block 450, a feedback service may send commands in real-time to the user's recording device to expand the capabilities of the user's recording device and improve the quality of the user's recording based on the evaluation of the recording shown in block 420 and the analysis of other recordings shown in block 440. The feedback provided to the user may include, but is not limited to, advice on extending a length of the user recording, advice on extending battery life of the user recording device, advice on user recording location, and advice on user recording quality settings, such as resolution, audio, color, dimension, orientation, recording angle, and the like. For example, feedback commands may include, but are not limited to, "We have captured enough footage so your recording is no longer needed," "Please turn to the left slightly and continue recording video," and "Please move away, you are interfering with a recording."

In block 460, an embodiment pools all registered recordings of the event to create one or more composite recordings of improved quality using post-processing digital improvement techniques. The digital improvement techniques of an embodiment may include, but are not limited to, improving lighting and contrast of the recording, improving focus of the recording, reducing noise in the recording, improving cropping of the recording, stitching together multiple overlapping segments of media, augmenting the recording with a soundscape based on multi-source audio composition, and augmenting the recording with a multi-view image or video composition that allows different vantage points of the event.

According to an embodiment, the construction of one or more recording composites may be performed automatically by use of spatial modeling of the sources and subjects of the recordings. In addition, interpolation and digital rendering may be used to provide a more continuous experience of the one or more recording composites. When it is possible to determine which direction the recording device is pointed, direction of aim will be considered in the aggregated digital recording. The direction of the recording device may be determined based on the identification of landmarks in the background, sunlight during the time of the day, and the like.

In block 470, after the post-processing construction of the one or more higher quality composite recordings, as shown in block 460, the registered user is offered an option to download the one or more composite recordings of the event as a substitute for the user's original recording. According to an embodiment, a registered user may upload recordings of an event, and then, based on the content of the recording, annotations of the registered user, assessment of the quality of the recording, and comparisons to other simultaneous or historical recordings of the same subject and the same content, the user may be offered a substitute composite recording that the system determines is better in quality than the user's uploaded recording. In an embodiment, the substitute composite recordings may be downloaded by the registered user for a fee. The substitution of recordings also promotes the elimination of low quality recordings from a shared storage system, such as a cloud, and thereby conserves storage memory.

In block 480, based on the patterns of substitution shown in block 470, a recording skill rating is automatically assigned to the user. The recording skill rating of a user can be used to prioritize future offerings of substitute recordings and weighting of a user's recording in the construction of a composite recording for improved quality. In addition, an embodiment may provide a service to registered users to improve their recordings by suggesting similar settings, vantage points, and fields of view used by other skilled users who have made high-quality recordings of the same subject in the past. Other embodiments to determine the recording skill rating of a user may include attributes unrelated to skill, such as the battery life left in the recording devices, the amount of white noise around the subject, and other attributes specific to the user.

Figure 5:
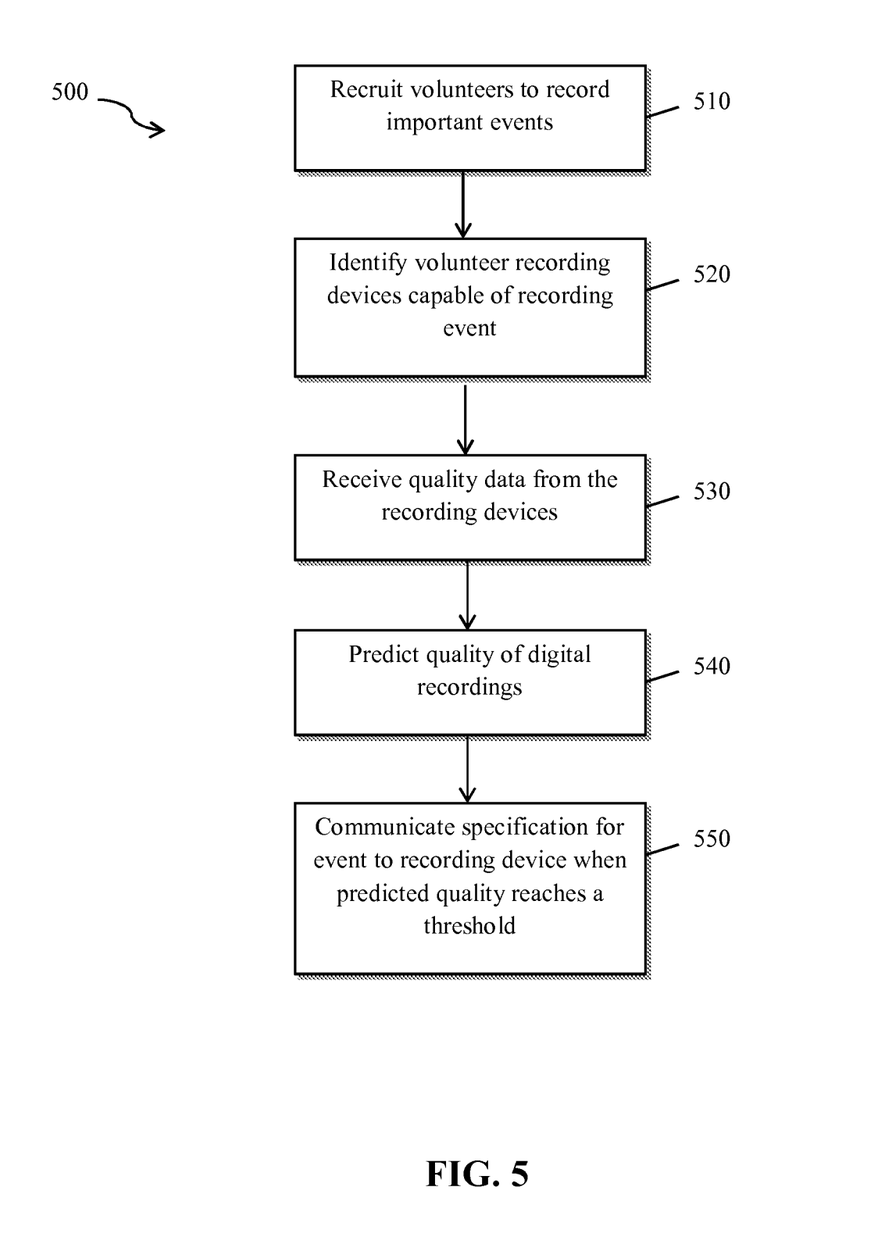
FIG. 5 depicts a flow diagram of an operation for recruiting volunteer recorders for important events according to an embodiment of the present invention.

Referring to FIG. 5, an operation 500 for recruiting volunteer recorders for important events of an embodiment is shown. According to an embodiment, a user can register with a computer server 12 to be recruited as a volunteer to record an important event, as shown in block 510.

In block 520, when an important event is detected, the computer server 12 identifies all volunteer recording devices that are capable of recording the important event. The computer server 12 then receives recording quality data from each identified volunteer recording device, as shown in block 530. In block 540, the computer server 12 predicts the quality of the digital recordings of each volunteer recording device. If the predicted quality of the digital recordings reaches a predetermined threshold, then the computer server 12 notifies the volunteer of the important event and communicates a recording specification, which includes an exact location and recording details, for the event to the volunteer recording device, as shown in block 550. When the recordings are complete, the recordings are pooled to create a higher quality composite recording as described above in block 480 of FIG. 4.

According to another embodiment, a sampling of previous recordings of the same subject by past users, which share similar attributes with the user, may be displayed as a reference for the current user. For example, the father of a family of five on vacation is taking a picture of a famous statue. When he focuses in on the statue his camera communicates with the computer server 12 and registers the famous statue. The computer server 12 then transmits to the current user's camera display several other interesting angles to take the picture as well as some angles with other families of five so that the current user can get ideas of how to position his family in front of the famous statue. An embodiment allows a user to take a picture of some object and have a computer server 12 figure out what the object is based on location and image data, and return information related to the object to the user.

According to another embodiment, a recording in a virtual universe may be improved in quality by aggregating multiple recordings. A virtual universe scene may be recorded from an avatar point of view. The computer server 12 may obtain votes on the point of view and store the recording of the point of view for playback when a number of votes exceed a predetermined threshold. According to an embodiment, the votes may be determined while the recording is being made and commands sent to an avatar to alter position during the recording. Also, reconstruction of a composite recording may include, but is not limited to, rerecording a scene based on the geometry of a scene and coordinates of objects in the scenes, the combining of audio sources, and the side-by-side showing of two views at once for an important scene.

For example, recordings from the point of view of different avatars may be made, and voting used to establish the "best" or preferred view. When the number of votes for a particular point of view exceeds a threshold, this view may be stored and offered for playback. The recording of an event may be stored as MPEG files at various resolutions. Some users may have access to higher-bandwidth connections than others and, as a result, may be able to record more detail. In some cases, scenes are combined or merged with more than one point of view as the recording is taking place. For example, avatar 1 may be asked to turn to the right, and his audio recording is combined with avatar 2 who is at a different location.

According to another embodiment, all registered users may receive automatic notifications that an event is being recording by multiple attendees. Automatic management of copyrights of artists may be provided by issuing a paid-in-full license to digital recordings of the event using the service of an embodiment. Embodiments may provide enhanced video annotation of audio recordings based on videos taken of a subject at various times during the sound recording. Embodiments may provide cover art for an audio recording based on images taken of a subject during the recording. According to another embodiment, years after an event takes place, new audio/video may be discovered and added to enhance the collective recording of the event.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the FIGS. 1-5 illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A computer-implemented method comprising:
notifying a user, registered as a volunteer, of an event and location and recording instructions for recording the event when a predicted quality of a user recording by the user and other recordings reaches a predetermined threshold;
evaluating, with a processing device of a computer machine, the user recording of the event by a user recording device of the user, the evaluating including a determination of a subject and quality of the user recording;
identifying, with the processing device, other recording devices in the vicinity of the user recording device that are recording the same subject concurrently to expand the capabilities of the user recording device through crowdsourcing;
analyzing, with the processing device, whether an aspect of recordings from the other recording devices is superior in quality to the user recording according to crowdsourced quality assessments;
sending, with the processing device, feedback to the user recording device to expand the capabilities of the user recording device and to improve the quality of the user recording; and
pooling, with the processing device, all recordings of the event to create a higher quality recording using digital improvement techniques.

2. The computer-implemented method of claim 1, wherein the user is offered to download one or more alternate recordings of the event that are determined to be of higher quality than the user recording of the event.

3. The computer-implemented method of claim 1, wherein a recording skill rating is assigned to the user, the recording skill rating is referenced to prioritize a weighting and scheduling of the user recording in creating a composite recording and to suggest alternate recording settings used by other users having high recording skill ratings.

4. The computer-implemented method of claim 1, wherein a database stores uploaded recordings of an event, data regarding each registered user and their location, a status of a recording for each registered user, a recording capability for each registered user, and characteristics of a recording device used by each registered user.

5. The computer-implemented method of claim 1, wherein the crowdsourced quality assessments are selected among a group comprising:
measuring a baseline noise of the recording;
determining sources of the recording using an independent component analysis to separate the sources from the noise;
determining a lighting source based on differences in brightness and contrast available from recording devices at different vantage points; and
evaluating historical data of the recording made at the same location at different times.

6. The computer-implemented method of claim 1, wherein the digital improvement techniques are selected among a group comprising:
improving lighting and contrast of the recording;
improving focus of the recording;
reducing noise in the recording;
improving cropping of the recording;
stitching together multiple overlapping segments of media;
augmenting the recording with a soundscape based on multi-source audio composition; and
augmenting the recording with a multi-view composition for different vantage points of the event.

7. The computer-implemented method of claim 1, wherein a sampling of previous recordings of the same subject by past users, which share similar attributes with the user, is displayed for reference by the user.

8. The computer-implemented method of claim 1, wherein the feedback provided to the user is selected among a group comprising advice on extending a length of the user recording, advice on extending battery life of the user recording device, advice on user recording settings and orientation, and advice on user recording location.

9. The computer-implemented method of claim 1, wherein an event is selected among a group comprising a sporting event, a crime scene, a concert, a convention, a natural disaster, a local or national emergency, a vehicular accident, a legal proceeding, and a virtual universe.

10. The computer-implemented method of claim 9, wherein the virtual universe further comprises recording a virtual universe scene from an avatar point of view, obtaining votes on the point of view, and storing a recording of the point of view for playback when a number of votes exceed a predetermined threshold.

11. A computer system comprising:
a processor, a system memory, and a bus that couples various system components including the system memory to the processor, the system configured to perform a method comprising:
notifying a user, registered as a volunteer, of an event and location and recording instructions for recording the event when a predicted quality of a user recording by the user and other recordings reaches a predetermined threshold
evaluating the user recording of the event by a user recording device of the user, the evaluating including a determination of a subject and quality of the user recording;
identifying other recording devices in the vicinity of the user recording device that are recording the same subject concurrently to expand the capabilities of the user recording device through crowdsourcing;
analyzing whether an aspect of recordings from the other recording devices is superior in quality to the user recording according to crowdsourced quality assessments;
sending feedback to the user recording device to expand the capabilities of the user recording device and to improve the quality of the user recording; and
pooling all recordings of the event to create a higher quality recording using digital improvement techniques.

12. The computer system of claim 11, wherein the user is offered to download one or more alternate recordings of the event that are determined to be of higher quality than the user recording of the event.

13. The computer system of claim 11, wherein a recording skill rating is assigned to the user, the recording skill rating is referenced to prioritize a weighting and scheduling of the user recording in creating a composite recording and to suggest alternate recording settings used by other users having high recording skill ratings.

14. The computer system of claim 11, wherein a database stores uploaded recordings of an event, data regarding each registered user and their location, a status of a recording for each registered user, a recording capability for each registered user, and characteristics of a recording device used by each registered user.

15. The computer system of claim 11, wherein the crowdsourced quality assessments are selected among a group comprising:
  measuring a baseline noise of the recording;
  determining sources of the recording using an independent component analysis to separate the sources from the noise;
  determining a lighting source based on differences in brightness and contrast available from recording devices at different vantage points; and
  evaluating historical data of the recording made at the same location at different times.

16. The computer system of claim 11, wherein the digital improvement techniques are selected among a group comprising:
  improving lighting and contrast of the recording;
  improving focus of the recording;
  reducing noise in the recording;
  improving cropping of the recording;
  stitching together multiple overlapping segments of media;
  augmenting the recording with a soundscape based on multi-source audio composition; and
  augmenting the recording with a multi-view composition for different vantage points of the event.

17. The computer system of claim 11, wherein a sampling of previous recordings of the same subject by past users, which share similar attributes with the user, is displayed for reference by the user.

18. The computer system of claim 11, wherein the feedback provided to the user is selected among a group comprising advice on extending a length of the user recording, advice on extending battery life of the user recording device, advice on user recording settings and orientation, and advice on user recording location.

19. The computer system of claim 11, wherein an event is selected among a group comprising a sporting event, a crime scene, a concert, a convention, a natural disaster, a local or national emergency, a vehicular accident, a legal proceeding, and a virtual universe.

20. The computer system of claim 19, wherein the virtual universe further comprises recording a virtual universe scene from an avatar point of view, obtaining votes on the point of view, and storing a recording of the point of view for playback when a number of votes exceed a predetermined threshold.

21. A non-transitory computer program product comprising:
  a computer readable storage medium having computer readable program code stored thereon that, when executed, performs a method, the method comprising:
  notifying a user, registered as a volunteer, of an event and location and recording instructions for recording the event when a predicted quality of a user recording by the user and other recordings reaches a predetermined threshold;
  evaluating, with a processing device, the user recording of the event by a user recording device of the user, the evaluating including a determination of a subject and quality of the user recording;
  identifying other recording devices in the vicinity of the user recording device that are recording the same subject concurrently to expand the capabilities of the user recording device through crowdsourcing;
  analyzing whether an aspect of recordings from the other recording devices is superior in quality to the user recording according to crowdsourced quality assessments;
  sending feedback to the user recording device to expand the capabilities of the user recording device and to improve the quality of the user recording;
  pooling all recordings of the event to create a higher quality recording using digital improvement techniques; and
  offering the user one or more alternate recordings of the event to download that are determined to be of higher quality than the user recording of the event.

22. The computer program product of claim 21, wherein a recording skill rating is assigned to the user, the recording skill rating is referenced to prioritize a weighting and scheduling of the user recording in creating a composite recording and to suggest alternate recording settings used by other users having high recording skill ratings.

* * * * *